(12) United States Patent
Thomas et al.

(10) Patent No.: US 9,163,155 B2
(45) Date of Patent: Oct. 20, 2015

(54) LUMINESCENT LANTHANIDE COMPLEX, AND ARTICLES AND INKS CONTAINING THE LUMINESCENT COMPLEX

(71) Applicant: SICPA HOLDING SA, Prilly (CH)

(72) Inventors: Frédéric Thomas, Cousset (CH); Cécile Laporte, Yverdon-les-Bains (CH)

(73) Assignee: SICPA HOLDING SA, Prilly (CH)

(*) Notice: Subject to any disclaimer, the term of this patent is extended or adjusted under 35 U.S.C. 154(b) by 53 days.

(21) Appl. No.: 14/040,020

(22) Filed: Sep. 27, 2013

(65) Prior Publication Data

US 2014/0093664 A1    Apr. 3, 2014

Related U.S. Application Data

(60) Provisional application No. 61/707,282, filed on Sep. 28, 2012.

(30) Foreign Application Priority Data

Oct. 4, 2012    (EP) .................. PCT/EP2012/069666

(51) Int. Cl.
| | | |
|---|---|---|
| C09D 11/50 | (2014.01) | |
| C09B 57/10 | (2006.01) | |
| B44F 1/10 | (2006.01) | |
| B41M 3/14 | (2006.01) | |
| C09D 11/328 | (2014.01) | |

(52) U.S. Cl.
CPC . C09D 11/50 (2013.01); B44F 1/10 (2013.01); C09B 57/10 (2013.01); C09D 11/328 (2013.01); *B41M 3/144* (2013.01)

(58) Field of Classification Search
CPC ........... C09F 11/50; C09B 57/10; B44F 1/10; B41M 3/144
USPC .................. 106/31.15, 31.32, 31.64; 534/16; 428/29; 252/301.16
See application file for complete search history.

(56) References Cited

U.S. PATENT DOCUMENTS

| | | | | |
|---|---|---|---|---|
| 5,435,937 | A * | 7/1995 | Bell et al. .................. | 534/16 |
| 5,542,971 | A | 8/1996 | Auslander et al. | |
| 6,071,632 | A * | 6/2000 | Hall-Goulle ............. | 252/301.16 |
| 6,402,986 | B1 | 6/2002 | Jones et al. | |
| 6,565,770 | B1 | 5/2003 | Mayer et al. | |
| 6,905,538 | B2 | 6/2005 | Auslander | |
| 7,108,742 | B2 | 9/2006 | Hall-Goulle et al. | |
| 7,381,758 | B2 | 6/2008 | Vuarnoz et al. | |
| 8,685,276 | B2 * | 4/2014 | Aboutanos et al. ........ | 106/31.15 |
| 2005/0033053 | A1 | 2/2005 | Lee et al. | |
| 2005/0042428 | A1 | 2/2005 | Dean | |
| 2007/0134160 | A1 | 6/2007 | Leif et al. | |
| 2007/0225402 | A1 | 9/2007 | Choi et al. | |
| 2008/0221328 | A1 * | 9/2008 | Reedijk et al. ................. | 546/5 |
| 2008/0306250 | A1 | 12/2008 | Reardon | |
| 2009/0000509 | A1 | 1/2009 | Potrawa et al. | |
| 2009/0214972 | A1 | 8/2009 | Wosnick et al. | |
| 2009/0281290 | A1 * | 11/2009 | de Bettencourt-Dias ....... | 534/15 |
| 2010/0084852 | A1 | 4/2010 | Hampden-Smith et al. | |
| 2010/0307376 | A1 | 12/2010 | Aboutanos et al. | |

FOREIGN PATENT DOCUMENTS

| | | |
|---|---|---|
| WO | 97/10307 | 3/1997 |
| WO | 2008/033059 | 3/2008 |
| WO | 2008/065085 | 6/2008 |
| WO | 2008/092522 | 8/2008 |
| WO | 2009/005733 | 1/2009 |

OTHER PUBLICATIONS

Aebischer et al. Intrinsic quantum yields and radiative lifetimes of lanthanide tris(dipicolinates); Jan. 19, 2009, Physical Chemistry Chemical Physics, vol. 11, pp. 1346-1353.
Brayshaw et al., "Synthetic, Structural, and Spectroscopic Studies on Solids Containing Tris(dipicolinato) Rare Earth Anions and Transition or Main Group Metal Cations", Inorg. Chem. 1995, 34, 2068-2076.

* cited by examiner

*Primary Examiner* — Helene Klemanski
(74) *Attorney, Agent, or Firm* — Greenblum & Bernstein, P.L.C.

(57) ABSTRACT

Luminescent lanthanide complex and inks containing the complex as well as its method of production and article including the complex, wherein the complex includes the formula:

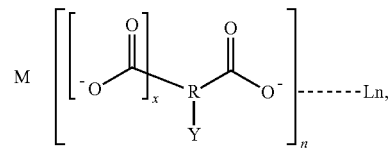

wherein M is chosen from the alkali cations $Li^+$, $Na^+$, $K^+$, $Rb^+$ and $Cs^+$ and mixtures thereof and is present to neutralize charge of the complex;
wherein Ln is chosen from the trivalent rare-earth cations of Ce, Pr, Nd, Sm, Eu, Gd, Tb, Dy, Ho, Er, Tm, and Yb and mixtures thereof;
wherein R is a $C_5$ to $C_6$ heteroaryl:
wherein Y is an optionally substituted $C_3$-$C_8$ heterocycloalkyl moiety linked to R by an N atom;
wherein n is an integer of 3 or 5; and
wherein x is an integer of 0 or 1.

43 Claims, No Drawings

LUMINESCENT LANTHANIDE COMPLEX, AND ARTICLES AND INKS CONTAINING THE LUMINESCENT COMPLEX

CROSS-REFERENCE TO RELATED APPLICATIONS

The present application claims the benefit under 35 U.S.C. §119(e) of U.S. Provisional Application No. 61/707,282, filed Sep. 28, 2012 and claims priority under 35 U.S.C. §119 of International Application No. PCT/EP2012/069666, filed Oct. 4, 2012. The entire disclosures of these applications are expressly incorporated by reference herein.

FIELD OF THE INVENTION

The invention relates to the field of security documents, packaging or items of value and aims at improving the security level of such documents, packaging or items of value. The present invention preferably relates to paper based documents or substrates onto which can be applied or printed a composition comprising luminescent lanthanide complexes.

BACKGROUND OF THE INVENTION

Secure documents such as currency, passports, or identity cards are increasingly counterfeited around the world. This situation is a very critical issue for governments and society in general. For example, criminal organizations may use fake passports or identity cards for trafficking of human beings. As reprographic technologies become more and more sophisticated, it becomes even more difficult to make a clear distinction between a fake document and the original. Document security has therefore a considerable impact on the economy of countries and also on victims of illicit traffic involving counterfeit documents.

Passports and identity cards are in general secure documents which contain a large number of protections, such as holograms, bar codes, encrypted data, specific papers or substrates, etc. Some protections are visible to the unaided eye ("overt" features), other protections are invisible ("covert" features) and their detection requires specific equipment.

Paper related documents which have valuable interest such as banknotes, fiduciary documents or even recently diplomas, such as diplomas from high schools and colleges and universities, are highly subject to counterfeit. In university or college or high school, for example, the level of security of diplomas made with paper is not enough to prevent illicit reproduction. Very often in such documents there is found as a control element the stamp of the college or university or high school, and eventually a hologram as a security feature. However, holograms are more susceptible to easy reproduction as printing techniques become more and more sophisticated. This permits counterfeiters to reproduce such documents of value, including the college or university or high school stamp.

In order to prevent such diversion there is a need to find alternative solutions to protect such documents, especially documents made with paper. Security inks comprising luminescent compounds are known to prevent such diversion and very often inkjet compositions are used to protect documents of value.

In US 2007/0225402 A1, which is incorporated by reference herein in its entirety, the use of an ultraviolet luminescent ink is disclosed, which is printed in form of indicia onto the document. The ultraviolet luminescent ink is invisible under natural light, such that the indicia can be only revealed under irradiation with UV light. This ultraviolet luminescent ink is useful for applying codes onto security documents such as passports or banknotes. In the cited document, printing processes, including silk screen, gravure, letterpress and offset printing are used to apply the invisible ultraviolet fluorescent inks.

Luminescent compounds in pigment form have been widely used in inks and other preparations (see U.S. Pat. No. 6,565,770, WO 2008/033059 A2, WO 2008/092522 A1). Examples of luminescent pigments can be found in certain classes of inorganic compounds, such as the sulphides, oxysulphides, phosphates, vanadates, garnets, spinels, etc. of nonluminescent cations, doped with at least one luminescent cation chosen from the transition-metal or the rare-earth ions.

Another class of compound useful to produce luminescence in ink is formed by certain rare-earth metal complexes such as described in WO 2009/005733 A1 and its family member US 2009/0000509 A1 or in U.S. Pat. No. 7,108,742, which are incorporated by reference herein in their entireties.

A particular process for imprinting secure documents with luminescent compounds, in particular luminescent rare-earth metal complexes, is inkjet printing, and more particularly thermal inkjet printing. Thermal inkjet printers use print cartridges having a series of tiny electrically heated chambers, constructed by photolithography. To produce an image, the printer sends a pulse of electric current through heating elements disposed in the back of each chamber, causing a steam explosion in the chamber, so as to form a bubble, which propels a droplet of ink through an orifice of the chamber onto the paper in front of it (hence the tradename Bubblejet® for certain inkjet printers). The ink's surface tension, as well as the condensation and thus contraction of the vapor bubble, pulls a further charge of ink into the chamber through a narrow channel attached to an ink reservoir.

The ink used is aqueous (i.e., a water-based ink comprising pigments or dyes), and the print head is generally cheaper to produce than the equipment required for other inkjet technologies. However, its lifetime is short, and it is generally exchanged together with the empty ink cartridge.

A major problem encountered with inkjet printers is ink drying in the printhead's nozzles, causing the pigments and/or dyes to form a solid deposit that plugs the microscopic ink orifices. Most printers prevent this drying by automatically covering the printhead nozzles with a rubber cap when the printer is not in use. Abrupt power loss, or unplugging the printer before it has capping of the printhead can, however, cause the printhead to dry out. Further, even when capped—this seal being not perfect—, over a period of several weeks, the ink in the nozzles can dry out and plug them. Once ink begins to dry out in the nozzles, the drop volume is affected, the drop trajectory can change, or the nozzle can completely fail to jet any ink.

In the case of luminescent inkjet inks comprising rare earth metal complexes, the stability of the complex in water is critical to avoid nozzle obstruction. In order to prevent premature drying, adding water or solvent, to sufficiently dilute the ink, is an obvious solution. However, dilution with water or solvent reduces the intensity of luminescence (and thus the ease of detection) of the security document printed with such ink.

Another problem also very often encountered when using ink which comprises luminescent pigments when used, for example, in a water based ink composition with inkjet printer (very often used for printing security document or packaging of value made with paper), is their stability as well as degradation of the ink inside the nozzle of the printer by known mechanisms such as Kogation or precipitation.

Although rare earth metal complexes would represent a very useful way of imparting luminescence to inkjet inks, the problem of ink drying in the nozzles makes it often impossible to use the inkjet cartridges in their entirety, and causes thus increased ink cartridge consumption cost. This has not only an ecological and security impact, due to the "recycling" problem caused by such "used" cartridge, but also a non-negligible impact on the cost of printing.

US 2010/0307376 A1, which is incorporated by reference herein in its entirety, is directed to a lanthanide chelates and secure documents containing lanthanide chelates, and provides many advantages and overcomes many of the disadvantages of the prior art, especially disadvantages resulting from stability, premature drying and Kogation.

Despite the considerable interest of such luminescent inks, the paper which must be protected remains a problem, because not all luminescent inks will adhere to the surface of the paper. Additionally, more problematic is the fact that the ink used when printed onto paper type documents or items does not confer to the paper a high level of security. The security element present in such ink when printed to the paper is not fully revealed or its signal remains relatively weak which does not allow a full recognition of the genuine paper type document or items.

There is therefore still a need to have a specific and selected water based composition which allows to provide a high level of security when printed on a paper substrate, which allows allow an efficient level of recognition of the security element with a specific luminescent profile hard to reproduce comprised in water based ink composition and which also avoid the drawbacks of instability, kogation and precipitation inside the nozzle of the ink jet printer.

Thus, there is still a crucial need to solve the above mentioned problems in order to promote the efficient use of luminescent ink-jet inks based on rare earth metal complexes, and therefore to obtain correctly printed and protected security documents during the whole life of the ink cartridge.

SUMMARY OF THE INVENTION

The present invention overcomes the above described disadvantages by:

a) providing a stable and high level of luminescence with specific luminescent profile for efficient marking of paper documents of value during the whole life of the ink cartridge, which allows recognition easily and efficiently of the luminescence as well as its profile, and b) avoiding nozzle obstruction responsible for the impossibility to use the ink cartridge in its entirety.

The foregoing is accomplished by providing an aqueous inkjet composition comprising at least one luminescent lanthanide complex of the formula.

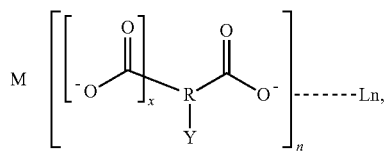

wherein M is chosen from the alkali cations $Li^+$, $Na^+$, $K^+$, $Rb^+$ and $Cs^+$ and mixtures thereof and is present to neutralize charge of the complex;

wherein Ln is chosen from the trivalent rare-earth cations of Ce, Pr, Nd, Sm, Eu, Gd, Tb, Dy, Ho, Er, Tm, and Yb and mixtures thereof;

wherein R is a $C_5$ to $C_6$ heteroaryl;

wherein Y is an optionally substituted $C_3$-$C_8$ heterocycloalkyl moiety linked to R by an N atom;

wherein n is an integer of 3 or 5; and wherein x is an integer of 0 or 1.

There is also provided a lanthanide complex according to the following formula:

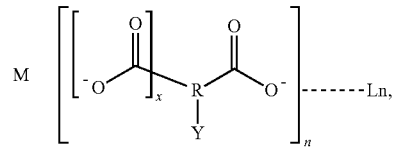

wherein M is chosen from the alkali cations $Li^+$, $Na^+$, $K^+$, $Rb^+$ and $Cs^+$ and mixtures thereof and is present to neutralize charge of the complex;

wherein Ln is chosen from the trivalent rare-earth cations of Ce, Pr, Nd, Sm, Eu, Gd, Tb, Dy, Ho, Er, Tm, and Yb and mixtures thereof;

wherein R is a $C_5$ to $C_6$ heteroaryl:

wherein Y is an optionally substituted $C_3$-$C_8$ heterocycloalkyl moiety linked to R by an N atom;

wherein n is an integer of 3 or 5; and wherein x is an integer of 0 or 1.

The at least one luminescent lanthanide complex can be a recrystallized product having exact stoichiometry of 1:3.

The at least one luminescent lanthanide complex can be a recrystallized product having exact stoichiometry of 1:5.

Preferably, no excessive R component in free form is present in the ink.

An amount of the complex preferably does not exceed 0.1 wt % based of the total weight of the at least one luminescent lanthanide complex.

An amount of the complex can be between 0.1 wt % and 0.25 wt % based on the total weight of the complex.

The aqueous ink composition can include at least one hygroscopic substance, such as 5 to 45 wt % of the at least one hygroscopic substance, based on the total weight of the composition.

The at least one hygroscopic substance can be selected from primary, secondary or tertiary alcohol, lactams, polymeric glycol, glycol, and cyclic sulfone, and mixtures thereof.

The at least one hygroscopic substance can be selected from DL-hexane-1,2-diol, 2-pyrrolidone, sulfolane, tetramethylene sulfoxide, gamma-butyrolactone, 1,3-dimethyl-2-imidazolidinone, 2-propanediol, pentanediol, 1,2 hexanediol, trimethylolpropane, glycerol, ethyleneglycol, diethyleneglycol, polypropyleneglycol, polyethyleneglycol, ethanol, propanol, and butanol, and mixtures thereof.

The aqueous ink composition can include at least one visible dyestuff or pigment, such as 1 to 15 wt % of the at least one visible dyestuff or pigment, based on the total weight of the composition.

The at least one visible dyestuff or pigment can be selected from monoazo and/or disazo dyes, monoazo Cu-complexes dyes.

The aqueous ink composition can contain 1-15 wt % of the at least one luminescent lanthanide complex, based on the total weight of the composition.

R can be pyridine, imidazole, triazole, pyrazole, or pyrazine.

R taken together with the at least one carboxylic acid group attached thereto can be dipicolinic acid and/or 4-hydroxypyridine-2,6-dicarboxylic acid, and Ln can be chosen from the trivalent ions of Europium (Eu3+) and/or Terbium (Tb3+).

Y can be a moiety of aziridine, azetidine, imidazolidine, pyrrolidine, pyrrolidin-e-one, pyrrolidine-2-thione, thiomorpholine, morpholine, hexahydropyrimidine, piperazine, azepane, or azocane.

The $C_3$-$C_8$ heterocycloalkyl can be substituted with a $C_1$-$C_6$ alkyl or $C_1$-$C_6$ alkoxy.

There are also provided articles comprising the aqueous ink compositions.

There are also provided security documents comprising at least one layer made with the aqueous ink composition.

There are also provided processes for obtaining the at least one luminescent lanthanide complex comprising reacting one equivalent of precursor compound of a trivalent or pentavalent lanthanide ion Ln with 3 or 5 equivalents of the R component in the presence of the alkali cation M to neutralize the complex.

The precursor compound of the trivalent lanthanide ion Ln can be selected from the group consisting of oxides $Ln_2O_3$, chlorides $LnCl_3$, carbonates $Ln_2(CO_3)_3$ and acetates $Ln(CH_3COO)_3$.

The R component can be employed as a free acid $H_2A$ together with a required amount of base, or as a monoalkali-salt HMA, or as a dialkali salt $M_2A$.

The components of the complex can be combined in aqueous solution, and the resulting complex can be recrystallized so as to separate it from byproducts of the reaction.

The article can be a banknote, passport, a security document, a value document, a diploma, a fiduciary document, a packaging, a ticket, a foil, a thread, a label or a commercial good.

The article can be a paper article.

The at least one luminescent lanthanide complex can be a recrystallized product.

Preferably, n can be 3 and/or x can be 1.

The optionally substituted $C_3$-$C_8$ heterocycloalkyl moiety can include at least one N atom in addition to the N atom through which Y is linked to R.

The optionally substituted $C_3$-$C_8$ heterocycloalkyl moiety can include at least one O atom.

The luminescent lanthanide complex can absorb in the ultraviolet and/or the blue region of the electromagnetic spectrum. The luminescent emission in these lanthanide complexes can be due to inner f-shell transitions such as: $^5D_0 \rightarrow ^7F_1$ and $^5Do \rightarrow ^7F_2$ for Eu (3+).

According to the present invention, a neat stoichiometric complex of the luminescent lanthanide complex is preferably used, rather than a solution of a rare-earth ion salt in a large excess of the R group. This is possible with R groups that form very stable anionic complexes with the rare-earth ion, such that no dissociation (hydrolysis or pyrolysis) occurs in aqueous solution upon heating. Hydrolysis would noteworthy lead to precipitates and corresponding nozzle obstruction.

Thus, according to the present invention, a neat luminescent lanthanide complex is preferably used. The use of such neat complex salt avoids any unnecessary excess of free R group in the ink, reducing thus its overall solid content, and therewith its tendency to obstruct (to clog) the inkjet nozzles through kogation or drying.

These and other features and advantages of the present invention will be more readily understood from a reading of the following detailed description by those of ordinary skill in the art. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

DETAILED DESCRIPTION OF THE INVENTION

According to the present invention, there is provided a lanthanide complex according to the following formula:

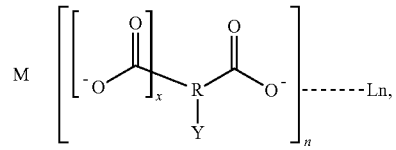

wherein M is chosen from the alkali cations $Li^+$, $Na^+$, $K^+$, $Rb^+$ and $Cs^+$ and mixtures thereof and is present to neutralize charge of the complex;

wherein Ln is chosen from the trivalent rare-earth cations of Ce, Pr, Nd, Sm, Eu, Gd, Tb, Dy, Ho, Er, Tm, and Yb and mixtures thereof;

wherein R is a $C_5$ to $C_6$ heteroaryl:

wherein Y is an optionally substituted $C_3$-$C_8$ heterocycloalkyl moiety linked to R by an N atom;

wherein n is an integer of 3 or 5; and wherein x is an integer of 0 or 1.

Moreover, there is provided an aqueous inkjet composition comprising at least one luminescent lanthanide complex of the formula:

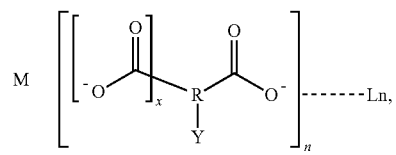

wherein M is chosen from the alkali cations $Li^+$, $Na^+$, $K^+$, $Rb^+$ and $Cs^+$ and mixtures thereof and is present to neutralize charge of the complex;

wherein Ln is chosen from the trivalent rare-earth cations of Ce, Pr, Nd, Sm, Eu, Gd, Tb, Dy, Ho, Er, Tm, and Yb and mixtures thereof;

wherein R is a $C_5$ to $C_6$ heteroaryl;

wherein Y is an optionally substituted $C_3$-$C_8$ heterocycloalkyl moiety linked to R by an N atom;

wherein n is an integer of 3 or 5; and wherein x is an integer of 0 or 1.

R is preferably pyridine, imidazole, triazole, pyrazole, or pyrazine. For example, R taken together with the at least one carboxylic acid group attached thereto can be, for example, dipicolinic acid, 4-hydroxypyridine-2,6-dicarboxylic acid, 4-amino-pyridine-2,6-dicarboxylic acid, 4-ethoxypyridine-2,6-dicarboxylic acid, 4-isopropoxypyridine-2,6-dicarboxylic acid and/or 4-methoxypyridine-2,6-dicarboxylic acid, preferably dipicolinic acid and/or 4-hydroxypyridine-2,6-dicarboxylic acid.

Y is preferably a moiety of aziridine, azetidine, imidazolidine, pyrrolidine, pyrrolidin-e-one, pyrrolidine-2-thione, thiomorpholine, morpholine, hexahydropyrimidine, piperazine, azepane, or azocane. Preferably, Y can be substituted with a $C_1$-$C_6$ alkyl, such as a methyl, ethyl, isopropyl, etc., or $C_1$-$C_6$ alkoxy, such as a methoxy, ethoxy, isopropoxy, etc.

Preferably, the lanthanide ion is Europium (Eu3+) and/or Terbium (Tb3+). Preferably, dipolinic acid or 4-hydroxypyridine-2,6-dicarboxylic acid are used in combination with Europium (Eu3+).

The at least one luminescent lanthanide complex is preferably a recrystallized product.

Preferably, n is 3 and/or x is 1.

The optionally substituted $C_3$-$C_8$ heterocycloalkyl moiety can include at least one N atom in addition to the N atom through which Y is linked to R. Moreover, the optionally substituted $C_3$-$C_8$ heterocycloalkyl moiety includes at least one O atom.

There is also provided processes for obtaining the at least one luminescent lanthanide complex. The process can include reacting one equivalent of precursor compound of a trivalent or pentavalent lanthanide ion Ln with 3 or 5 equivalents of the R component in the presence of the alkali cation M to neutralize the complex.

The precursor compound of the lanthanide ion Ln can be selected from the group consisting of oxides, chlorides, carbonates and acetates, such as $Ln_2O_3$, $LnCl_3$, $Ln_2(CO_3)_3$ and $Ln(CH_3COO)_3$ The R component can be employed as a free acid $H_2A$ together with a required amount of base, or as a monoalkali-salt HMA, or as a dialkali salt $M_2A$.

The components of the complex can be combined in aqueous solution, and the resulting complex can be recrystallized so as to separate it from byproducts of the reaction.

For example, the components of the complex salt are combined in aqueous solution, e.g.

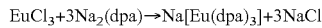

$EuCl_3 + 3Na_2(dpa) \rightarrow Na[Eu(dpa)_3] + 3NaCl$ and the resulting complex salt is preferably recrystallized, so as to separate it from byproducts of the reaction, such as NaCl, which are not desirable to achieve the goal of the invention, i.e., an ink with the lowest possible solid contents.

The lanthanide complex wherein Y is an optionally substituted $C_3$-$C_8$ heterocycloalkyl moiety linked to R by an N atom is particularly advantageous. Such lanthanide complex can have multiple emissions bands, such as, two emission bands, such as one emission band at a wavelength of around 230 nm to 275 nm, for example 254 nm, and another emission band at a wavelength of around 340 to 375 nm, for example, 366 nm. Lanthanide complexes being capable of having two emission bands, or two or more emission bands provide the ability for better anti-counterfeiting techniques by having more complicated emission measurements associated with the lanthanide complexes.

The advantage of the recrystallization process is to provide a luminescent lanthanide complex with a minimal by-product content. This has an impact on the solubility of the complex and on the drying or kogation phenomena. In a preferred embodiment the concentration of Cl⁻ present with the luminescent lanthanide complex is below 0.1% Cl⁻ of the total weight of the complex salt or 0.17% NaCl, respectively. To obtain high quality of print, the final chloride content of the luminescent lanthanide complex should not exceed 0.1 wt %. In case of an acceptable print quality, the chloride content of the complex salt can be between 0.1 wt % and 0.25 wt % of the luminescent lanthanide complex.

The at least one luminescent lanthanide complex can preferably be a recrystallized product having exact stoichiometry of 1:3 or having exact stoichiometry of 1:5.

The at least one luminescent lanthanide complex is preferably included in an aqueous ink composition. The aqueous ink composition preferably contains 1-45 wt % of the at least one luminescent lanthanide complex, based on the total weight of the composition, more preferably 1 to 8 wt %, and even more preferably 1 to 3 wt %.

Preferably, no excessive R component in free form is present in the ink.

In order to prevent the premature drying of the aqueous ink composition according to the present invention during the printing process, the aqueous inkjet ink of the invention further can comprise at least one hygroscopic substance. The at least one hygroscopic substance is preferably present at a concentration of 5 to 45 wt % of the at least one hygroscopic substance, based on the total weight of the composition, more preferably 10 to 45 wt % and even more preferably 20 to 45 wt %. The at least one hygroscopic substance can be selected from primary, secondary or tertiary alcohol, lactams, polymeric glycol, glycol, and cyclic sulfone, and mixtures thereof. For example, the at least one hygroscopic substance can preferably be selected from DL-hexane-1,2-diol, 2-pyrrolidone, sulfolane, tetramethylene sulfoxide, gamma-butyrolactone, 1,3-dimethyl-2-imidazolidinone, 2-propanediol, pentanediol, 1,2 hexanediol, trimethylolpropane, glycerol, ethyleneglycol, diethyleneglycol, polypropyleneglycol, polyethyleneglycol, ethanol, propanol, and butanol, and mixtures thereof.

The aqueous ink composition can also preferably include at least one visible dyestuff or pigment, such as 1 to 15 wt % of the at least one visible dyestuff or pigment, based on the total weight of the composition. The at least one visible dyestuff or pigment can be selected from monoazo and/or disazo dyes, monoazo Cu-complexes dyes. Examples of such dyestuff can be those produced by CIBA company under the name of IRGASPERSE Jet®.

Depending on the nature of the security documents to be imprinted, the printing ink according to the present invention can furthermore comprise customary additives, such as, for example, fungicides, biocides surfactants, sequestering agents, pH adjusters, co solvents or binders, such as, for example, acrylate binders, in the amounts customary for these additives.

There are also provided articles comprising the aqueous ink compositions either directly on the article or on a substrate, such as a label and/or a package associated with the article. For example, the aqueous ink according to the present invention can be used for authenticating an article, such as a banknote, a passport, a security document, a value document, a ticket, a foil, a thread, a label, a card, a diploma, a fiduciary document, a packaging, or a commercial good. For example, there can be provided a security document comprising at least one layer made with an ink according to the invention.

The ink according to the present invention is particularly useful for printing on paper, such as a paper article or paper label.

The aqueous ink according to the present invention is particularly suitable for thermal ink-jet printing which is an efficient inkjet printing technique for the coding and marking of products, packages or documents of value. Accordingly, the ink composition is preferably formulated for use thermal ink-jet printing.

The invention is further illustrated by the following non-limiting examples. Percentages are by weight. Those skilled in the art will recognize that many variations are possible within the spirit and scope of these examples, which are intended to be defined by the following claims and their equivalents in which all terms are meant in their broadest reasonable sense unless otherwise indicated.

The invention is further illustrated by the following non-limiting examples. Percentages are by weight unless otherwise indicated. Those skilled in the art will recognize that many variations are possible within the spirit and scope of these examples, which are intended to be defined by the following claims and their equivalents in which all terms are meant in their broadest reasonable sense unless otherwise indicated.

EXAMPLES

Example 1

Synthesis of 4-chloropyridine-2,6-dicarboxylic acid (Cldpa)

To a solution of dichlorophenyl phosphine oxide (1.492 mol, 290.8 g) at 120° C. slowly add under stirring chelidamic acid (0.373 mol, 75.0 g). Heat the reaction mixture at 120° C. for 2 hr under an inert atmosphere. Take care to avoid a too-fast formation of foam. After cooling at 80° C., the reaction mixture is poured into $H_2O$ (1 L). By gradually pouring, the reaction mixture can turn solid. The solid is filtered, washed twice with $H_2O$ and dried overnight at 70° C. (97%).

1H NMR [(CD3)2SO]: δ 8.24 (s, 2H)

Example 2

Synthesis of 4-pyrrolidinopyridine-2,6-dicarboxylic acid (Pyrrodpa)

4-chloropyridine-2,6-dicarboxylic acid (0.238 mol, 48.0 g) is slowly added under stirring to a solution of pyrrolidine (0.952 mol, 67.8 g) at room temperature. Take care to avoid a too-fast addition leading to local temperature increase. Observe precipitation of a solid. The reaction mixture is heated at 120° C. for 2 hr. By gradually heating, the reaction mixture becomes solid. After cooling at 60° C., $H_2O$ (80 ml) is added and the mixture is stirred for 30 min until the solid is completely dissolved. The solution is then acidified with HCl (2M) until pH=1. The formed precipitate is filtered, washed twice $H_2O$ and dried overnight at 70° C. (93%).

1H NMR [(CD3)2SO]: δ 7.25 (s, 2H), 3.44 (t, 4H), 2.01 (t, 4H)

Example 3

Synthesis of 4-Morpholino-pyridine-2,6-dicarboxylic acid (Morphodpa)

4-chloro-pyridine-2,6-dicarboxylic acid (0.025 mol, 5.0 g) is slowly added under stirring to a solution of morpholine (0.250 mol, 21.6 g) at room temperature. Care is taken to avoid a too-fast addition leading to local temperature increase. Precipitation of a solid is observed. The reaction mixture is heated at 120° C. for 2 hr. By gradually heating the reaction mixture becomes solid. After cooling at 60° C., $H_2O$ (80 ml) is added and the mixture is stirred for 30 min. until the solid is completely dissolved. The solution is then acidified with 2M HCl until pH=1. The formed precipitate is filtered, washed twice $H_2O$ and dried overnight at 70° C. (70%)

1H NMR [(CD3)2SO] δ: 7.59 (s, 2H), 3.72 (t, 4H), 3.44 (t, 4H)

Example 4

Synthesis of $Na_3[Eu(Pyrrodpa)_3]*nH_2O$

A solution of 2M NaOH is added to a suspension of 4-pyrrolidinopyridine-2,6-dicarboxylic acid (0.042 mol, 10.0 g) in 85 ml of distilled water to adjust the pH (pH~8) which results in complete dissolution of the reaction mixture. Then a solution of $EuCl_3.6H_2O$ (0.014 mol, 5.2 g) in 10 ml of $H_2O$ is added and the reaction mixture is stirred at room temperature for 30 min. After stirring the mixture is first neutralized with 2M NaOH (pH~8) and then heated until 50° C. Once the temperature is reached, $H_2O$ is added until a clear solution is obtained. Acetone (~2*V$H_2O$) is successively added to precipitate the complex and the mixture is cooled until room temperature. The precipitate is finally filtered, washed with acetone and dried overnight at 70° C.

Example 5

Synthesis of $Na_3[Tb(Pyrrodpa)_3]*nH_2O$

A solution of 2M NaOH is added to a suspension of 4-pyrrolidinopyridine-2,6-dicarboxylic acid (0.042 mol, 10.0 g) in 85 ml of distilled water to adjust the pH (pH~8) which results in complete dissolution of the reaction mixture. Then a solution of $TbCl_3.6H_2O$ (0.014 mol, 5.3 g) in 10 ml of $H_2O$ is added and the reaction mixture is stirred at room temperature for 30 min. After stirring the mixture is first neutralized with 2M NaOH (pH~8) and then heated until 50° C. Once the temperature is reached, $H_2O$ is added until a clear solution is obtained. Acetone (~2*V$H_2O$) is successively added to precipitate the complex and the mixture is cooled until room temperature. The precipitate is finally filtered, washed with acetone and dried overnight at 70° C.

Example 6

Synthesis of $Na_3[Eu(Morphodpa)_3]*nH_2O$

A solution of 2M NaOH is added to a suspension of 4-morpholinopyridine-2,6-dicarboxylic acid (0.040 mol, 10.0 g) in 85 ml of distilled water to adjust the pH (pH~8) which results in complete dissolution of the reaction mixture. Then a solution of $EuCl_3.6H_2O$ (0.013 mol, 4.8 g) in 10 ml of $H_2O$ is added and the reaction mixture is stirred at room temperature for 30 min. After stirring the mixture is first neutralized with 2M NaOH (pH~8) and then heated until 50° C. Once the temperature is reached, $H_2O$ is added until a clear solution is obtained. Acetone (~2*V$H_2O$) is successively added to precipitate the complex and the mixture is cooled until room temperature. The precipitate is finally filtered, washed with acetone and dried overnight at 70° C.

Example 7

Synthesis of $Na_3[Tb(Morphodpa)_3]*nH_2O$

A solution of 2M NaOH is added to a suspension of 4-morpholinopyridine-2,6-dicarboxylic acid (0.040 mol, 10.0 g) in 85 ml of distilled water to adjust the pH (pH~8) which results in complete dissolution of the reaction mixture. Then a solution of $TbCl_3.6H_2O$ (0.013 mol, 4.9 g) in 10 ml of $H_2O$ is added and the reaction mixture is stirred at room temperature for 30 min. After stirring the mixture is first neutralized with 2M NaOH (pH~8) and then heated until 50° C. Once the temperature is reached, $H_2O$ is added until a clear solution is obtained. Acetone (~2*VH₂O) is successively added to precipitate the complex and the mixture is cooled until room temperature. The precipitate is finally filtered, washed with acetone and dried overnight at 70° C.

Example 8

Example of formulation of an ink containing a complex according to the invention:

Black with fluorescent red (excitation at 254 and 366 nm):

To a solution of deionized water (40.5 g) are added 2-pyrrolidone 5 g) and 1,2-hexanediol (2.5 g). The solution is stirred at 500-600 rpm in order to obtain a homogenized solution. 2 g of Na₃[Eu(Pyrrodpa)₃]*nH₂O are added to the solution, then heated at 40° C. until the complex is totally solubilized. The solution is cooled to ambient temperature, and then 18 g of Irgasperse® Jet Cyan RL, 13.65 g Irgasperse® Jet yellow RL and 4.35 g Irgasperse® Jet Magenta B are added, the mixture is stirred at 500-600 rpm around 20 minutes. After stirring, the solution is filtered to remove all insoluble compounds and unreacted products.

The black with fluorescent red ink obtained is packaged in a HP45 cartridge and is used with a Deskjet printer of the 960Cxi, 970Cxi, 980Cxi or 990Cxi series. Fluorescence is checked using a fisher Bioblock Scientific VL-4.LC lamp is well visible. In order to assess ink stability, two tests are performed:

Printing of 200 pages in a row followed by 2 to 4 days interruption and restart for another 400 pages.

Short print tests are made after 1 week, 2 weeks, 3 weeks, 4 weeks and then every 4 weeks over a 6 month period.

No problems of printing and drying are expected with the ink according to the present invention during stability testing. In all cases fluorescence intensity for the inventive compounds would be expected to remain unchanged at very satisfactory level.

The foregoing examples are merely illustrative of some of the features of the invention. The appended claims are intended to claim the invention as broadly as it has been conceived and the examples herein presented are illustrative of selected embodiments from a manifold of all possible embodiments. Accordingly it is Applicants' intention that the appended claims are not to be limited by the choice of examples utilized to illustrate features of the present invention.

What is claimed is:

1. Aqueous inkjet ink composition comprising at least one luminescent lanthanide complex of the formula:

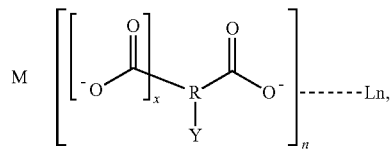

wherein M is chosen from the alkali cations Li⁺, Na⁺, K⁺, Rb⁺ and Cs⁺ and mixtures thereof and is present to neutralize charge of the complex;

wherein Ln is chosen from the trivalent rare-earth cations of Ce, Pr, Nd, Sm, Eu, Gd, Tb, Dy, Ho, Er, Tm, and Yb and mixtures thereof;

wherein R is a $C_5$ to $C_6$ heteroaryl:

wherein Y is an optionally substituted $C_3$-$C_8$ heterocycloalkyl moiety linked to R by an N atom;

wherein n is an integer of 3 or 5; and wherein x is an integer of 0 or 1.

2. The aqueous ink composition according to claim 1 wherein the at least one luminescent lanthanide complex is a recrystallized product having exact stoichiometry of 1:3.

3. The aqueous ink composition according to claim 1 wherein the at least one luminescent lanthanide complex is a recrystallized product having exact stoichiometry of 1:5.

4. The aqueous ink composition according to claim 1 wherein no excessive ligand R component in free form is present in the ink.

5. The aqueous ink composition according to claim 1 wherein an amount of Cl⁻ the complex does not exceed 0.1 wt % based of the total weight of the complex.

6. The aqueous ink composition according to claim 1 wherein an amount of Cl⁻ the complex is between 0.1 wt % and 0.25 wt % based on the total weight of the complex.

7. The aqueous ink composition according to claim 1 further including at least one hygroscopic substance.

8. The aqueous ink composition according to claim 1 further including at least one visible dyestuff or pigment.

9. The aqueous ink composition according to claim 1 which contains 1-15 wt % of the at least one luminescent lanthanide complex, based on the total weight of the composition.

10. The aqueous ink composition according to claim 7 which contains 5 to 45 wt % of the at least one hygroscopic substance, based on the total weight of the composition.

11. The aqueous ink composition according to claim 8 which contains 1 to 15 wt % of the at least one visible dyestuff or pigment, based on the total weight of the composition.

12. The aqueous ink composition according to claim 7 wherein the at least one hygroscopic substance is selected from primary, secondary or tertiary alcohol, lactams, polymeric glycol, glycol, and cyclic sulfone, and mixtures thereof.

13. The aqueous ink composition according to claim 7 wherein the at least one hygroscopic substance is selected from DL-hexane-1,2-diol, 2-pyrrolidone, sulfolane, tetramethylene sulfoxide, gamma-butyrolactone, 1,3-dimethyl-2-imidazolidinone, 2-propanediol, pentanediol, 1,2 hexanediol, trimethylolpropane, glycerol, ethyleneglycol, diethyleneglycol, polypropyleneglycol, polyethyleneglycol, ethanol, propanol, and butanol, and mixtures thereof.

14. The aqueous ink composition according to claim 8 wherein the at least one visible dyestuff or pigment is selected from monoazo and/or disazo dyes, monoazo Cu-complexes dyes.

15. The aqueous ink composition according to claim 1, wherein R is pyridine, imidazole, triazole, pyrazole, or pyrazine.

16. The aqueous ink composition according to claim 1, wherein R taken together with the at least one carboxylic acid group attached thereto is dipicolinic acid and/or 4-hydroxypyridine-2,6-dicarboxylic acid, and wherein Ln is chosen from the trivalent ions of Europium (Eu3+) and/or Terbium (Tb3+).

17. The aqueous ink composition according to claim 16 wherein Y is a moiety of aziridine, azetidine, imidazolidine, pyrrolidine, pyrrolidin-e-one, pyrrolidine-2-thione, thiomorpholine, morpholine, hexahydropyrimidine, piperazine, azepane, or azocane.

18. The aqueous ink composition according to claim 17 wherein the $C_3$-$C_8$ heterocycloalkyl is substituted with a $C_1$-$C_6$ alkyl or $C_1$-$C_6$ alkoxy group.

19. An article comprising the aqueous ink composition according to claim 1.

20. A security document comprising at least one layer made with the aqueous ink composition according to claim 1.

21. Process to obtain the at least one luminescent lanthanide complex according to claim 1, comprising reacting one equivalent of precursor compound of a trivalent or pentavalent lanthanide ion Ln with 3 or 5 equivalents of the R component in the presence of at least 3 or 5 equivalents of the alkali cation M.

22. Process according to claim 21, wherein the precursor compound of the trivalent lanthanide ion Ln is selected from the group consisting of oxides $Ln_2O_3$, chlorides $LnCl_3$, carbonates $Ln_2(CO_3)_3$ and acetates $Ln(CH_3COO)_3$.

23. Process according to claim 21, wherein the R component is employed as a free acid together with a required amount of base, or as a monoalkali-salt, or as a dialkali salt.

24. Process according to claim 21, wherein the components of the complex are combined in aqueous solution, and the resulting complex is recrystallized so as to separate it from byproducts of the reaction.

25. The article according to claim 19, wherein the article is a banknote, passport, a security document, a value document, a diploma, a fiduciary document, a packaging, a ticket, a foil, a thread, a label or a commercial good.

26. The article according claim 19, wherein the article is a paper article.

27. The aqueous ink composition according to claim 1, wherein the at least one luminescent lanthanide complex is a recrystallized product.

28. The aqueous ink composition according to claim 1, wherein n=3.

29. The aqueous ink composition according to claim 1, wherein x=1.

30. The aqueous ink composition according to claim 1, wherein the optionally substituted $C_3$-$C_8$ heterocycloalkyl moiety includes at least one N atom in addition to the N atom through which Y is linked to R.

31. The aqueous ink composition according to claim 1 wherein the optionally substituted $C_3$-$C_8$ heterocycloalkyl moiety includes at least one 0 atom.

32. A lanthanide complex according to the following formula:

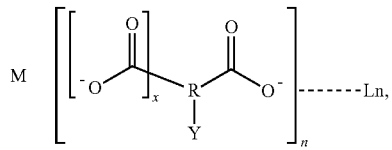

wherein M is chosen from the alkali cations $Li^+$, $Na^+$, $K^+$, $Rb^+$ and $Cs^+$ and mixtures thereof and is present to neutralize charge of the complex;

wherein Ln is chosen from the trivalent rare-earth cations of Ce, Pr, Nd, Sm, Eu, Gd, Tb, Dy, Ho, Er, Tm, and Yb and mixtures thereof;

wherein R is a $C_5$ to $C_6$ heteroaryl:

wherein Y is an optionally substituted $C_3$-$C_8$ heterocycloalkyl moiety linked to R by an N atom;

wherein n is an integer of 3 or 5; and wherein x is an integer of 0 or 1.

33. The lanthanide complex according to claim 32, wherein R is pyridine, imidazole, triazole, pyrazole, or pyrazine.

34. The lanthanide complex according to claim 32, wherein R taken together with the at least one carboxylic acid group attached thereto is dipicolinic acid and/or 4-hydroxypyridine-2,6-dicarboxylic acid and wherein Ln is chosen from the trivalent ions of Europium (Eu3+) and/or Terbium (Tb3+).

35. The lanthanide complex according to claim 32, wherein Y is a moiety of aziridine, azetidine, imidazolidine, pyrrolidine, pyrrolidin-e-one, pyrrolidine-2-thione, thiomorpholine, morpholine, hexahydropyrimidine, piperazine, azepane, or azocane.

36. The lanthanide complex according to claim 32, wherein the $C_3$-$C_8$ heterocycloalkyl is substituted with a $C_1$-$C_6$ alkyl or $C_1$-$C_6$ alkoxy group.

37. The lanthanide complex according to claim 32, wherein x=1.

38. The lanthanide complex according to claim 32, wherein the lanthanide complex is a recrystallized product.

39. The lanthanide complex according to claim 32, wherein n=3.

40. The lanthanide complex according to claim 32, wherein the optionally substituted $C_3$-$C_8$ heterocycloalkyl moiety includes at least one N atom in addition to the N atom through which Y is linked to R.

41. The lanthanide complex according to claim 32, wherein the optionally substituted $C_3$-$C_8$ heterocycloalkyl moiety includes at least one 0 atom.

42. Process for marking an article by propelling ink onto the article, wherein the propelled ink is an aqueous inkjet ink composition according to claim 1.

43. Process according to claim 42, wherein the propelling ink comprises applying the aqueous inkjet ink composition by thermal inkjet printing.

* * * * *